3,128,223
PROCESS FOR IMPROVING THE RETENTION OF MINERAL FILLERS IN THE FORMATION OF PAPER FLEECES

Guido von Rosenberg, Hellmut Jochinke, and Otto Huber, all of Frankfurt am Main, Germany, assignors to Farbwerke Hoechst Aktiengellschaft vormals Meister Lucius & Bruning, Frankfurt am Main, Germany, a corporation of Germany
No Drawing. Filed Oct. 24, 1961, Ser. No. 160,380
Claims priority, application Germany Oct. 28, 1960
3 Claims. (Cl. 162—181)

The present invention relates to a process for improving the retention of mineral fillers in the formation of paper fleeces.

In paper making it is usual to add fillers to the pulp in order to improve the quality of printing- and writing-papers. By adding fillers the finish, the dimensional stability, the white tint and the opacity are improved as well as the capacity for being written and printed on and the absorptive power for dyestuffs, etc., just to mention only a few qualities required especially for printing-papers.

As fillers serving to produce these effects there are used, e.g., bleaching clay, barium sulfate, mixtures of barium sulfate and zinc sulfate, diatomaceous earth, synthetic calcium silicates, titanium dioxide, zinc sulfide, and the like.

The quantities of fillers charged to the hollander, to the mixing beater or pulper may amount up to 50%, calculated on the air-dry solid matter (depending on the quality of the paper). Normally the fillers are chemically inert materials. Due to the lacking chemical affinity of these inorganic substances to the organic cellulose fiber, the quantity applied is in most cases in a very unfavourable relation to the quantity actually fixed in the paper.

The losses sustained in practice often amount to 80 percent and more. Such high losses of material impair the economy of the process especially in the case of expensive products, such as titanium dioxide or zinc sulfide, and generally also cause troubles in the disposal of the waste water.

Attempts have, therefore, been made to improve the retention of the fillers by using auxiliary agents. Thus various authors have proposed the use of auxiliary agents improving the retention, for example polyethylene imine, chlorinated starch, chlorinated sodium silicate or partially degraded starch. Recently there have also been proposed galacto-mannans, or the commercially available modification products thereof, for this purpose. Also esters of titanic acid or zirconic acid, for example esters with the alcoholic group of citric acid or tartaric acid or complex compounds, for example reaction products of titanic acid or zirconic acid with triethanol amine, are effective with respect to improving the retention. However, the production of the last-mentioned agents is rather complicated. In many cases the effect is unsatisfactory. Thus galacto-mannans, for example, are incompatible with synthetic resins which are already added to the aqueous suspension in order to set the paper, such as melamine- or urea-formaldehyde resin.

It is also known that the retention of mineral fillers in the formation of fleeces from aqueous suspensions can be improved by adding to the suspension prior to the sheet formation small quantities of certain hydrogels as auxiliary agents for improving the retention. As such agents there have hitherto been used aluminum sulfate $$(Al(SO_3)_3 \cdot 18H_2O)$$

sodium aluminate, aluminum chloride $(AlCl_3 \cdot 6H_2O)$ or aluminum nitrate $(Al(NO_3)_3 \cdot 9H_2O)$.

Now we have found that the retention of mineral fillers can still be improved by using a certain basic aluminum chloride of the formula $Al_2(OH)_5Cl \cdot 3H_2O$ as an auxiliary agent for improving the retention. This auxiliary agent is added in amounts which are very small in relation to the amount of the fiber and, if necessary, the filler. Generally the agents are added in amounts exceeding 0.5%. It is advantageous to add amounts ranging from 0.8 to 4%, but possibly also more, for example 6%, calculated on the weight of the fiber, respectively.

The auxiliary agents for improving the retention according to the invention may, of course, also be used in mixture with other auxiliary agents for improving the retention which are already known. Also in these cases the amount of $Al_2(OH)_5Cl \cdot 3H_2O$, calculated on the weight of the fiber, amounts at least to 0.5%. The mixing components in these mixtures are generally used in a molar ratio. These hydrogel mixtures can, for example, be prepared by introducing into the solution of said basic aluminum chloride the solution of a tetravalent titanium salt such as titanium sulfate, or the solution of sodium metasilicate, while stirring continuously. During this process a voluminous, aqueous hydrogel mixture is formed with which there are attained, e.g., within a pH range of 5 to 5.5, retention values of more than 80% with respect to the titanium dioxide added.

In order to obtain an especially effective gel, it is advisable to adjust the pulp to a pH having a higher basic value than 5, for example >5 to 6. In particular cases, and in order to obtain special effects, for example a great pore volume for filter papers, it may also be expedient to effect the precipitation at higher pH values, e.g., above the neutral point up to a pH value of 9. When carrying out the precipitation in the alkaline range it is in many cases sufficient to apply relatively smaller amounts of said basic aluminum chloride than is the case in the acid range. For example, when carrying out the precipitation in the alkaline range, there is added 0.5 to 1% of the basic aluminum chloride, calculated on the amount of the fiber.

Said basic aluminum chloride of the formula $$Al_2(OH)_5Cl \cdot 3H_2O$$

can be used, e.g., in a colloidal aqueous solution. This colloidal solution can be prepared by simple dissolution in water. When the pH of such a solution, which is normally below 5, is increased to a value of above 5 by the addition of substances having an alkaline action or by buffer solutions, gelatinous aluminum hydroxide gel precipitates from these solutions. It is of special interest for industrial requirements that the basic aluminum chloride of the above-mentioned formula can be supplied in the dry state.

The improved retention by the hydrogels or hydrogel mixtures is apparently due to the fact that the high surface activity of these products on the one hand and the content of hydroxyl groups on the other hand increases the affinity to the cellulose fiber which likewise contains hydroxyl. Apparently this bonding mechanism represents a topochemical reaction between hydrogel and the fiber in such a manner that there is formed a bridging bond of protons between vicinal hydroxyl groups. Due to the enormous enlargement of the fiber surface taking place during this reaction it is possible that inert substances which have as little affinity to the fiber as titanium dioxide, barium sulfate, calcium silicate and the like as well as the mixtures thereof can be fixed at the surface-active places on the fiber.

The retention agent according to this invention forms an aqueous hydrogel by hydrolysis, which gel acts as a link between fiber and filler. Due to this bonding mechanism it becomes comprehensible that the mechanical strength values of papers made with the addition of hydrogel are higher than those made without this bonding agent.

Also the undesirable two-sidedness of filled and dyed papers which normally occurs in sheet formation, i.e., the asymmetric distribution of the filler or dyestuff in the sheet structure, is largely avoided by adding hydrogel to the pulp.

In practice, various possibilities exist to carry out the process according to the invention:

(1) For the formation of the hydrogel, the colloidal solution of the gel-forming salt is added to the aqueous pulp, and the formation of gel is effected by known chemical additions, for example lyes such as sodium or potassium hydroxide solutions, sodium or potassium carbonate, ammonia or buffer substances such as alkali metal salts of phosphoric acid or other weak acids in order to change the pH value. At the moment of the hydrogel formation, the hydrogel is in a very active state so that it is capable of reacting with the fiber surface and enlarges this surface enormously. Due to this fact it is possible to fix the inorganic fillers added previously or subsequently in the mixing beater. It is not of fundamental importance in which order the filler and the gel-forming salt are charged to the mixing beater.

(2) A colloidal solution of the gel-forming salt is gelled separately, i.e., outside the pulp, and dispersed, e.g., by means of a high speed stirrer. The product having solidified in the form of a jelly can be "liquefied" with the aid of this device, i.e., it can be dispersed into minute hydrogel particles. Also in this "liquefied" form as "hydrogel milk" it can fully exhibit its activity as an auxiliary agent for improving the retention.

(3) The filler, e.g., the above-mentioned fillers, can also be charged to a colloidal aqueous solution of the gel-forming salt and gelling is then effected in the presence of the filler. By mechanical dispersion particles of filling agents are obtained which are covered with the hydrogel and, owing to the aqueous hydrogel cover, adhere more easily to the fiber surface. The colloidal suspension can also be added to the pulp direct.

(4) If, by applying one of the usual drying processes, the water is eliminated from the hydrogel or hydrogel mixture and the xerogel obtained is pulverized, e.g., in a ball mill, a dust-fine powder is obtained which exhibits a high-percent retention in sheet formation owing to its large specific surface. It has, moreover, the characteristic to increase also the retention of added fillers considerably.

The further processing of the suspension into a paper web takes place in known manner, e.g., as described by J. B. Calkin and G. S. Withan, "Modern Pulp and Paper Making," 3rd Edition, Reinhold Publishing Corp., New York, 1957, and by J. P. Casey, "Pulp and Paper," 2nd Edition, volumes 1 to 3, Interscience Publishers Inc., New York, 1960/61.

The basic aluminum hydroxide of the formula $$Al_2(OH)_5Cl.3H_2O$$

is prepared by dissolution of aluminum metal in dilute hydrochloric acid and dehydration of the viscous solution obtained on a heated scale roller.

The following example serves to illustrate the invention but it is not intended to limit it thereto.

*Example*

Into a 0.6% aqueous pulp of bleached sulfite cellulose having a degree of freeness of 40° (Schopper-Riegler) (confer Korn-Burgstaller, "Handbuch der Werkstoffprufung," volume 4, Springer-Verlag, 1953, page 388) there are introduced in a mixing beater 5% (calculated on the sulfite cellulose) of titanium dioxide which had previously been stirred into water (if necessary, with the addition of a little polyphosphate in order to increase the dispersibility). The suspension thus contains 0.03% of titanium dioxide. Then basic aluminum chloride of the formula $Al_2(OH)_5Cl.3H_2O$ is added in an amount of 2%, calculated on the dry weight of the cellulose, in the form of a 5% colloidal aqueous solution. After thorough mechanical distribution, the pH is adjusted to a value of about 5.5 by means of sodium hydroxide solution or sulfuric acid, depending on whether the pH value of the pulp is acid or alkaline. Agitation in the mixing beater is continued for a short time in order to achieve a uniform distribution and the paper web is made in the usual manner on a paper machine. The precipitation can also take place prior to introducing the titanium dioxide into the pulp.

We claim:

1. A process for improving the retention of mineral fillers in the formation of paper fleeces from an aqueous cellulose pulp which comprises adding to the pulp containing a filler prior to the sheet formation as a hydrogel-forming substance at least 0.5% by weight calculated on the weight of the cellulose of a basic aluminum chloride of the formula $Al_2(OH)_5Cl.3H_2O$.

2. A process for improving the retention of mineral fillers in the formation of paper fleeces from an aqueous cellulose pulp, which comprises adding a colloidal aqueous solution of a basic aluminum chloride of the formula $Al_2(OH)_5Cl.3H_2O$ to an aqueous cellulose pulp containing a filler in an amount that the mixture contains at least 0.5% by weight of the basic aluminum chloride calculated on the weight of the cellulose, adjusting the pH to a value above 5 and processing the pulp thus treated into a paper web.

3. A process as claimed in claim 2, wherein the filler is added to the pulp after the addition of the colloidal aqueous basic aluminum chloride solution.

References Cited in the file of this patent

UNITED STATES PATENTS 3,074,843  Lagally et al. _____ Jan. 22, 1963

FOREIGN PATENTS 609,278  Canada _____ Nov. 22, 1960
627,311  Great Britain _____ Aug. 5, 1949
631,483  Great Britain _____ Nov. 3, 1949
844,945  France _____ May 1, 1939